(12) United States Patent
Johnston

(10) Patent No.: US 7,917,875 B1
(45) Date of Patent: Mar. 29, 2011

(54) CLOCK TREE ADJUSTABLE BUFFER

(75) Inventor: Thomas K. Johnston, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 95 days.

(21) Appl. No.: 12/390,858

(22) Filed: Feb. 23, 2009

Related U.S. Application Data

(62) Division of application No. 11/197,103, filed on Aug. 4, 2005, now Pat. No. 7,571,406.

(51) Int. Cl.
G06F 17/50 (2006.01)

(52) U.S. Cl. ............ 716/108; 716/105; 326/38; 326/95; 327/149; 327/161; 327/276

(58) Field of Classification Search .................. 716/105, 716/108; 326/38, 95; 327/149, 161, 276
See application file for complete search history.

(56) References Cited

U.S. PATENT DOCUMENTS

| 4,924,119 | A |   | 5/1990  | Lee             |         |
|-----------|---|---|---------|-----------------|---------|
| 5,231,319 | A |   | 7/1993  | Crafts et al.   |         |
| 5,298,805 | A | * | 3/1994  | Garverick et al.| 326/37  |
| 5,347,519 | A | * | 9/1994  | Cooke et al.    | 714/725 |
| 5,369,640 | A | * | 11/1994 | Watson et al.   | 714/700 |
| 5,384,497 | A | * | 1/1995  | Britton et al.  | 326/44  |
| 5,440,182 | A |   | 8/1995  | Dobbelaere      |         |
| 5,528,177 | A | * | 6/1996  | Sridhar et al.  | 326/113 |
| 5,544,342 | A | * | 8/1996  | Dean            | 711/119 |
| 5,610,543 | A |   | 3/1997  | Chang et al.    |         |
| 5,742,184 | A |   | 4/1998  | Martinez, Jr.   |         |
| 5,894,565 | A | * | 4/1999  | Furtek et al.   | 326/38  |
| 6,091,261 | A |   | 7/2000  | De Lange        |         |
| 6,130,551 | A | * | 10/2000 | Agrawal et al.  | 326/39  |
| 6,208,168 | B1|   | 3/2001  | Rhee            |         |

(Continued)

FOREIGN PATENT DOCUMENTS

JP 11232311 A 8/1999

(Continued)

OTHER PUBLICATIONS

Yusuke Nitta and Toshihiro Hattori. "Clock Distribution Techniques for a 200-MHz RISC Processor." Advanced Microcomputer Development Dept. Semiconductor Technology Development Center, Hirachi, Ltd. Aug. 23, 1999. (Session 6, presentation #3, 1:30-3:10pm).

Primary Examiner — Naum B Levin
(74) Attorney, Agent, or Firm — Gary R. Stanford

(57) ABSTRACT

An adjustable buffer including a series of P-channel devices having current paths coupled between a first voltage supply and at least one output node, and a series of N-channel devices having current paths coupled between the output node and a second voltage supply. The control electrodes of the P- and N-channel devices are coupled to a selected one of an input node and a corresponding voltage supply collectively forming first and second sets of selectable connections. The first and second sets of selectable connections are made to adjust delay from the input node to the output node. The selectable connections may be defined in an integrated circuit mask or may be electronic switches. The P- and N-channel devices may be in a balanced configuration or an imbalanced configuration. The P- and N-channel devices may form an inverting buffer or a non-inverting buffer.

20 Claims, 7 Drawing Sheets

U.S. PATENT DOCUMENTS

| | | |
|---|---|---|
| 6,229,336 B1 * | 5/2001 | Felton et al. .................... 326/38 |
| 6,275,070 B1 * | 8/2001 | Pantelakis et al. ............. 326/98 |
| 6,313,688 B1 | 11/2001 | Lee et al. |
| 6,347,850 B1 | 2/2002 | Volk |
| 6,356,116 B1 | 3/2002 | Oh |
| 6,426,661 B1 | 7/2002 | Curran |
| 6,574,781 B1 | 6/2003 | Harada et al. |
| 6,577,165 B1 | 6/2003 | Cheung et al. |
| 6,952,117 B2 * | 10/2005 | Forbes ........................... 326/93 |
| 7,023,252 B2 | 4/2006 | Schultz |
| 7,095,265 B2 | 8/2006 | Nguyen et al. |
| 7,102,407 B2 * | 9/2006 | Slawecki ....................... 327/263 |
| 7,501,903 B2 * | 3/2009 | Gabara ........................ 331/36 C |
| 2001/0043097 A1 | 11/2001 | Akita |
| 2004/0257882 A1 | 12/2004 | Stackhouse et al. |
| 2005/0046458 A1 * | 3/2005 | Schroeder et al. ............ 327/276 |
| 2005/0225365 A1 * | 10/2005 | Wood ........................... 327/141 |

FOREIGN PATENT DOCUMENTS

JP    2000035831 A    2/2000

* cited by examiner

CLOCK TREE ADJUSTABLE BUFFER

CROSS-REFERENCE TO RELATED APPLICATIONS

This application is a divisional application of copending, commonly assigned and currently pending U.S. patent application Ser. No. 11/197,103, filed on Aug. 4, 2005, which is herein incorporated by reference for all intents and purposes.

BACKGROUND OF THE INVENTION

1. Field of the Invention

The present invention relates in general to buffer circuits, and more specifically to a novel adjustable buffer configuration.

2. Description of the Related Art

Integrated circuits (large scale, very large scale, etc.) including system-on-chip (SOC) configurations employ one or more master or primary clock signals to synchronize sub-circuits in the system or on an integrated circuit (IC) or chip. The multiple clock signals are often related to each other, such as a higher frequency master clock and several lower frequency clocks (e.g., half-frequency clock, quarter-frequency clock, etc.). The chip employs a clock distribution system to distribute each primary clock signal from one or more root nodes to circuit destination nodes distributed on the chip. It is desired to distribute the clock signals in such a manner so that the applicable clock transitions (i.e., rising edges and/or falling edges) at each of the destination nodes occur simultaneously to ensure proper synchronous operation. Since the clock distribution system is a physical system with unavoidable variations and physical limitations, however, clock transition variations occur, and these variations are called clock skew. A primary goal of the clock distribution system is to minimize skew to within an acceptable level to effectively ensure or possibly even guarantee proper operation. The amount of allowable skew, however, is reduced as the frequency of one or more clock signals is increased.

Several clock distributions methods are known for minimizing skew in the system. One method employs the use of "H-trees" in which a parent clock provided to a common node or root node is distributed via conductive traces to four different end points, each end point being equidistant from the common root node and located within a corresponding one of four quadrants surrounding the root node. Each of the four end points of the primary H-tree formation defines a subsequent "child" root node for a smaller H-tree formation defining four new equidistant downstream end point nodes in corresponding sub-quadrants for each child root node. In this manner, the child H-trees become progressively smaller as the overall H-tree fans out across the circuit. The H-tree technique is an iterative process in which the primary clock is distributed to all applicable destination clock nodes sourced from a primary clock signal. Buffers are inserted along the H-tree routing path depending upon the wire lengths and loading requirements. H-trees are balanced by construction and thus achieve a very good balance within a single tree formation. Yet the H-tree process is a manual process which requires relatively large amount of man-hours to complete. And H-trees are not optimal for multiple tree formations or embedded sub-blocks with their own internal trees. Examples of embedded sub-blocks include processor blocks, digital signal processing (DSP) blocks, memory array blocks, etc. Such sub-blocks are often pre-designed within a CMOS library or the like and are placed on the chip at selected locations on the chip before the clock distribution system is defined. The H-tree formation is symmetrical by design but cannot be routed over the embedded sub-block structures, since such structures are generally relatively dense and do not provide sufficient room for H-tree buffers.

Another clock distribution method is known as clock tree synthesis or CTS. CTS is an automated process performed by a computer-aided design (CAD) system or the like in which a computer compiles one or more clock trees for the chip. The CTS method is automated and thus provides a clock distribution solution more quickly and potentially at reduced cost as compared to the H-tree technique. The CTS method is more suitable when the system includes multiple clocks and embedded sub-blocks. The conventional CTS method was, however, less accurate than the H-tree structure and the resulting compiled tree structures were more difficult to adjust or "tweak" to minimize skew. The compiled tree structures employed multiple buffer types with different timing and drive capabilities. In the conventional CTS process, the buffers were not adjustable so that if a different delay was necessary, the computer selected a different non-adjustable buffer. The branches of any given tree were not symmetrical since each branch was individually optimized and routed, which resulted in significant variations in tree fan-out structures from one branch to the next. In particular, the number of buffers and the wire lengths varied from one branch to another of a given tree. Although an initial CTS tree structure was optimized for under certain process (P), voltage (V) and temperature (T) conditions, because of the significant variation from one branch to another, the overall tree was not optimal for different PVT points. Thus, timing variations occurred due to variations in process, temperature and/or voltage variations for each tree.

Although the conventional CTS method attempted to optimize each tree (even if for a given PVT point), the timing variations between each compiled tree structure also had to be minimized. In one conventional method, an adjustable delay buffer was inserted at the root of each and every compiled tree including the slowest tree. The minimum delay for each adjustable delay buffer was significantly greater than the adjustable delay range of the buffer, so that an adjustable delay buffer had to be inserted at the root of every tree including the slowest tree to enable minimizing skew of all of the trees. The delay in front of the slowest tree was set to its minimal adjustment setting, and the remaining adjustable delays of the faster trees were further adjusted to slow down each faster tree to match the slowest tree. Using this solution to balance multiple trees incurred an undesired and non-trivial delay across the entire system. Adjustable delay buffers have also been provided at the very ends or "leaves" of each tree, as an alternative or in addition to delay buffers at the tree roots. Yet this method consumed valuable real estate since a rather large number of variable buffers were needed including one for each leaf even if the leaf buffers were smaller than the root buffers. The leaf buffers, which were usually smaller than the root-based adjustable buffers, provided only a limited adjustable delay range.

It is desired to provide a clock distribution system and method as automated as possible, that tracks PVT variations, and that enables intra-tree and inter-tree adjustment without inserting delay into the slowest tree.

BRIEF DESCRIPTION OF THE DRAWINGS

The benefits, features, and advantages of the present invention will become better understood with regard to the following description, and accompanying drawing in which.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
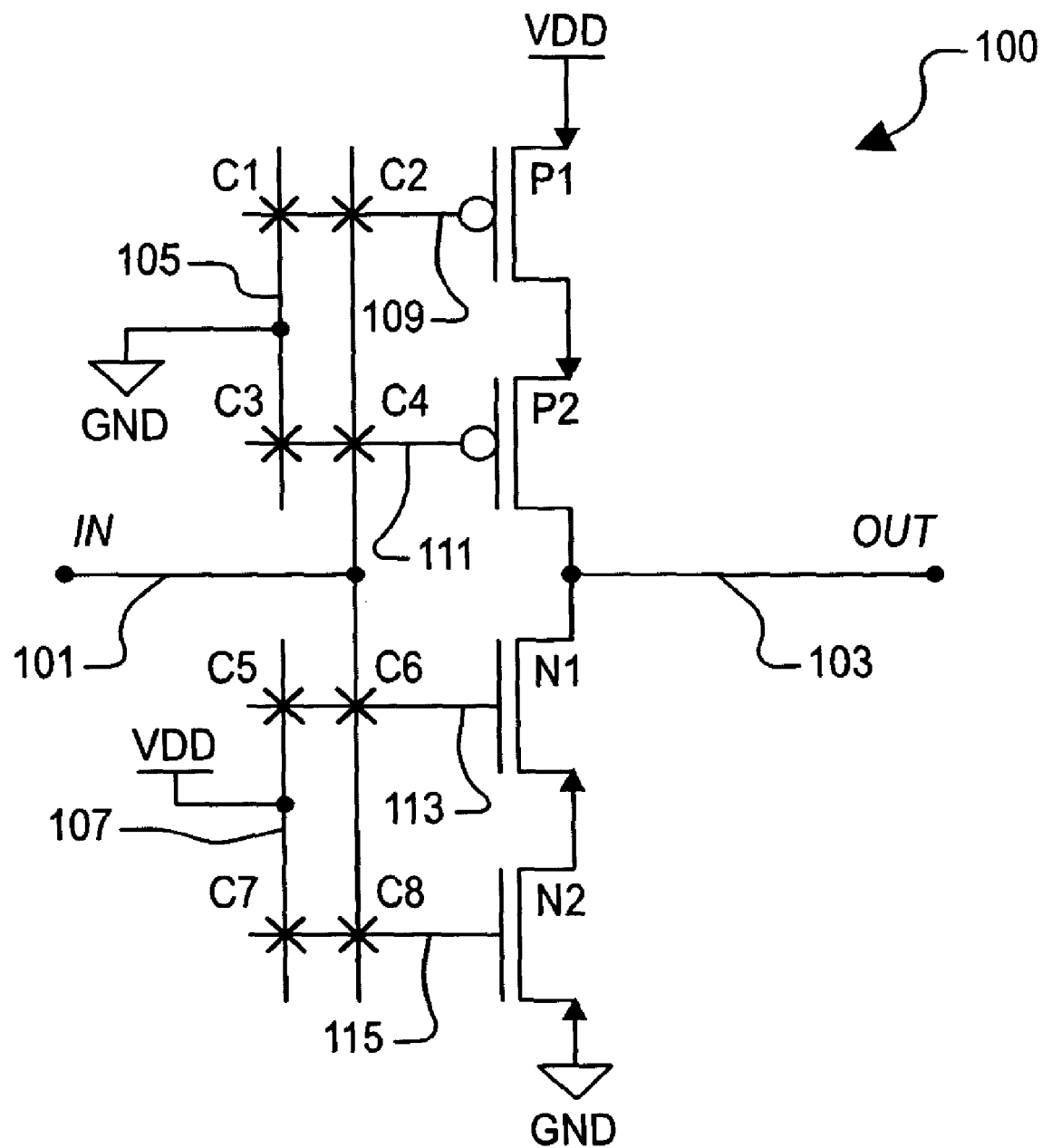
FIG. 1 is a schematic diagram of an adjustable inverting buffer implemented according to an exemplary embodiment of the present invention.

FIG. 1 is a schematic diagram of an adjustable inverting buffer 100 implemented according to an exemplary embodiment of the present invention. The inverting buffer 100 includes a pair of P-channel devices P1 and P2 and N-channel devices N1 and N2 coupled in a stacked configuration between a first voltage supply VDD and a common voltage supply, such as ground (GND). The P- and N-channel devices illustrated are complementary metal-oxide semiconductor (CMOS) transistors or the like, although similar type devices are contemplated. As illustrated, the source electrode (or "source") of P1 is coupled to VDD and its drain electrode (or "drain") is coupled to the source of P2, which has its drain coupled to an output node 103 developing an output signal OUT. The drain of N1 is coupled to node 103 and its source is coupled to the drain of N2, which has its source coupled to GND. An input signal IN is provided on an input node 101, which is routed near (e.g., close or adjacent) the gate electrodes (or simply "gates") of P1, P2, N1 and N2. A node 105 is coupled to GND and routed near the gates of P1 and P2, and a node 107 is coupled to VDD and routed near the gates of N1 and N2. A node 109 is coupled to the gate of P1 and routed near the nodes 101 and 105, a node 111 is coupled to the gate of P2 and routed near the nodes 101 and 105, a node 113 is coupled to the gate of N1 and routed near nodes 101 and 107 and a node 115 is coupled to the gate of N2 and routed near nodes 101 and 107.

Eight possible connection points C1, C2, C3, . . . , C8 are each illustrated with an "X" symbol denoting a possible connection between the nodes that are adjacent or near each other. A connection at C1 couples node 105 to 109 and thus the gate of P1 to GND, and a connection at C2 couples node 101 to 109 and thus the gate of P1 to receive the IN signal. The connection points C1 and C2 form a connection pair for coupling the gate of P1 either to GND or to IN. The C1 connection turns P1 on and the C2 connection causes P1 to turn on when IN is low and to turn off when IN is high. Although both connections C1 and C2 could be made, this would couple IN to GND. In general, only one of the connection pairs is made and the other is left open-circuited. Thus, one of the connections C1 and C2 is made to couple the gate of P1 to either GND or IN, one of the connection points C3 and C4 is selected to couple the gate of P2 to GND or IN, one of the connection points C5 and C6 is selected to couple the gate of N1 to VDD or IN and one of the connection points C7 and C8 is selected to couple the gate of N2 to VDD or IN. Also, the combination of both connections C1 and C3 would turn both P1 and P2 on and pull OUT high to VDD regardless of the state of IN, so that this combination is not selected or is otherwise not considered a "valid" connection combination. Also, the combination of both connections C5 and C7 is invalid since this would tie both of the gates of N1 and N2 to VDD, which would turn N1 and N2 on pulling OUT low to GND regardless of the state of IN.

It is desired to select a valid combination of the connection points C1-C8 to perform an inverting function while programming the delay of transition from IN to OUT. The connection points C1-C4 are selected to program the relative delay of the rising edge transition of OUT (from GND to VDD) in response to a falling edge transition of IN (from VDD to GND) and the connection points C5-C8 are selected to program the relative delay of the falling edge transition of OUT in response to a rising edge transition of IN. In particular, there are three valid combinations of the connection points C1-C4. The connections C1 and C4 are selected for a relatively fast rising edge transition, the connections C2 and C4 are selected for a relatively slow rising edge transition, and the connections C2 and C3 are selected for an in-between or medium delay rising edge transition. Similarly, the connections C6 and C7 are selected to program a relatively fast falling edge transition, the connections C6 and C8 are selected to program a relatively slow falling edge transition, and the connections C5 and C8 are selected to program a medium delay falling edge transition.

Since there are three valid combinations of the connections C1-C4 and three valid combinations of the connections C5-C8, there are a total of nine (9) valid combinations for the inverting buffer 100. Three of the nine valid combinations are considered "balanced" in which the rising and falling edge transition delays are programmed in a symmetrical manner, i.e., both slow, medium or fast. The balanced configurations for both rising and falling edges, or rising/falling edge transitions, are fast/fast, medium/medium, and slow/slow. The remaining six programmable configurations in which the programmed delay of the rising edge does not "match" the programmed delay of the falling edge are considered "imbalanced". In particular, the rising/falling edge transitions may be programmed as fast/slow, fast/medium, medium/slow, medium/fast, slow/fast or slow/medium. The actual transition delays depend on the relative size and configuration of the P- and N-channel devices, the conductive trace variables, the particular processes used to implement a chip or integrated circuit (IC), the in-circuit configuration such as relative loading at the output, etc. In a typical CMOS application assuming an average load at the output, the adjustable inverting buffer 100 exhibits a minimum delay for either rising or falling transition of about 100 picoseconds (ps), a maximum delay of about 140 ps, and an incremental delay adjustment of about 20 ps (to achieve adjustable delay settings of 100 ps, 120 ps and 140 ps for each rising/falling edge transition). It is appreciated, however, that the differential between valid connection combinations is not necessarily constant and may vary depending upon the types of devices and the processes used.

The method of making the selected connections depends upon the particular process used or implementing the chip. In one static embodiment, different layers of the IC are defined for voltage supplies (e.g., VDD, GND, etc.), signals (e.g., IN, OUT, etc.) and electrodes of CMOS devices (e.g., drain, source and gate). Conductive vias or contacts or traces are defined in the IC mask to determine which connections are made to the gate electrodes of the CMOS devices, such as between the input signal and a selected one of the supply voltages. Alternatively, it is possible to use fuses for the connection points in which fuses are blown to make or break a connection as known to those skilled in the art. Fuses, however, tend to be relatively large and expensive which may result in an impractical configuration if a large number of connection points are desired. Real-time or dynamic options are contemplated, such as electronic switches (e.g., CMOS devices or the like), which are turned on or off during operation to make or break each connection. An electronic switch placed at each connection point might otherwise significantly increase the size of the buffer. For example, the size of a buffer with four stacked devices and eight connection points is effectively tripled with the use of electronic switches at the connection points. Thus, dynamic electronic switches are only used in the event it is desired to dynamically re-configure the buffer during circuit operation. Otherwise, static connections are used to keep the size and cost of each buffer at a minimum.

P- and N-channel devices are used herein as programmable pull-up and pull-down devices, respectively, for determining the relative delay of rising and falling edge transitions, respectively. A control electrode for each device is selectively coupled depending upon its desired configuration. For P- and N-channel devices, the control electrode is the gate of the device for controlling its current path between its source and drain electrodes. The present invention contemplates the use of alternative pull-up and pull-down devices as known to those skilled in the art. Each device is either programmed as a "static" pull-up or pull-down device or as a dynamic device in which its state depends upon the input signal to the buffer.

Figure 2:
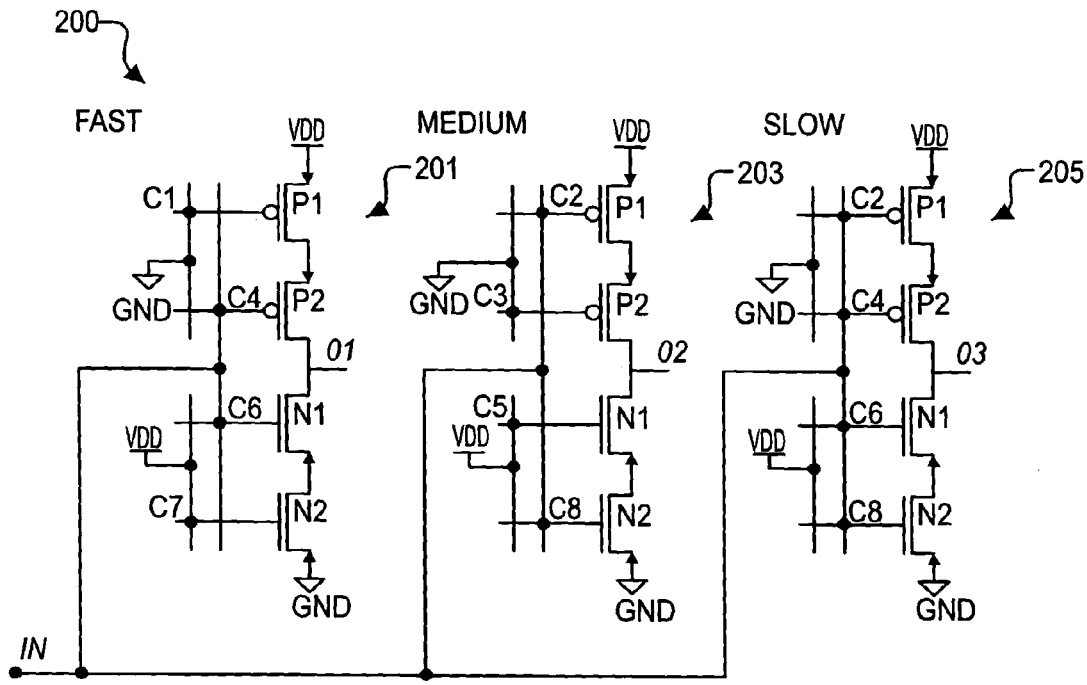
FIG. 2 is a schematic diagram of a circuit including three inverting buffers which are programmed with balanced fast, medium and slow rising and falling edge transitions, respectively.

FIG. 2 is a schematic diagram of a circuit 200 including inverting buffers 201, 203 and 205 which are programmed with balanced fast, medium and slow rising and falling edge transitions, respectively. Each of the inverting buffers 201, 203 and 205 are configured in substantially the same manner as the inverting buffer 100, except that each is programmed for balanced rising and falling edge transition delays. The "X" symbols are removed and replaced with connection dots "•" at selected locations illustrating the programmed configuration. Absence of a connection dot at a connection location means that the connection is not made leaving an open-circuit. The connection points C1, C4, C6 and C7 of the inverting buffer 201 are selected (e.g., programmed as illustrated with connection dots) to achieve fast rising and falling edge transitions, the connection points C2, C3, C5 and C8 of the inverting buffer 203 are selected to achieve medium rising and falling edge transitions, and the connections C2, C4, C6 and C8 of the inverting buffer 205 are selected to achieve relatively slow rising and falling edge transitions. The input signal IN is provided to the input nodes of each of the inverting buffers 201-205, and the inverting buffer 201 outputs signal O1, the inverting buffer 203 outputs signal O2 and the inverting buffer 205 outputs signal O3.

Figure 3:
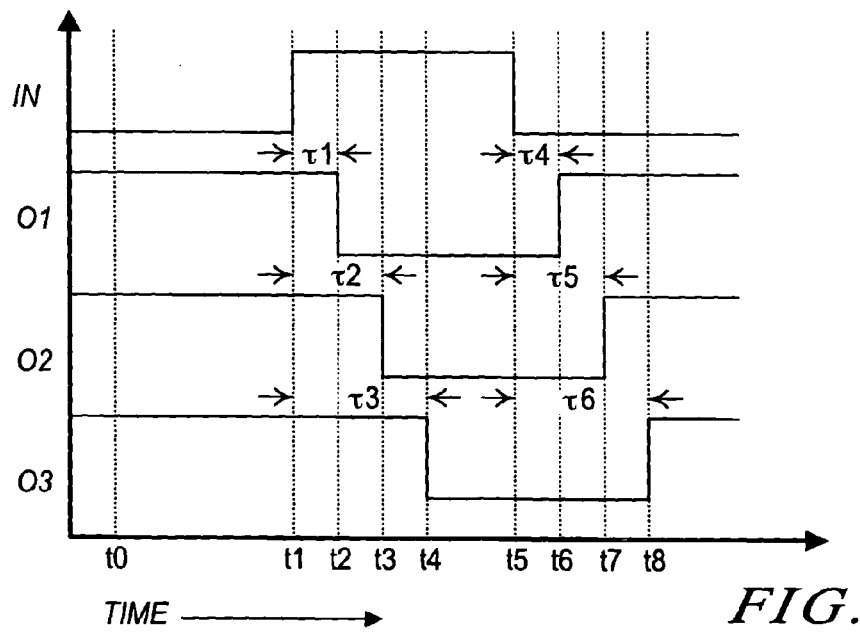
FIG. 3 is a timing diagram contrasting the relative delays of the balanced inverting buffers of FIG. 2.

FIG. 3 is a timing diagram contrasting the relative delays of the balanced inverting buffers 201-205 of FIG. 2. In the timing diagram, the IN, O1, O2 and O3 signals are plotted versus time. At a preliminary time t0, the IN signal is low and the O1, O2 and O3 signals are high. At a time t1, the IN signal is asserted high. At a subsequent time t2 after a relatively short delay $\tau 1$ from time t1 to t2, the O1 signal goes low while the O2 and O3 signals remain high. At a subsequent time t3 after a relatively medium delay $\tau 2$ from time t1 to t3, the O2 signal goes low while the O3 signal remains high. At a subsequent time t4 after a relatively long delay $\tau 3$ from time t1 to t4, the O3 signal goes low. The IN signal goes back low at a subsequent time t5. At next time t6 after a relatively short delay $\tau 4$ from time t5 to t6, the O1 signal goes high while the O2 and O3 signals remain low. At next time t7 after a relatively medium delay $\tau 5$ from time t5 to t7, the O2 signal goes high while the O3 signal remains low. At next time t8 after a relatively long delay $\tau 6$ from time t5 to t8, the O3 signal goes high. In this illustration, it is assumed (for simplified illustration) that the P- and N-channel devices are sized appropriately to achieve substantially the same delays between the rising and falling edge transitions, e.g., $\tau 1 \approx \tau 4$, $\tau 2 \approx \tau 5$, and $\tau 3 \approx \tau 6$. Also, $\tau 2$ is shown as twice $\tau 1$ and $\tau 3$ is shown as three times $\tau 1$, although non-linear variations may occur in actual configurations.

The "outer" P1 and N2 devices of the inverting buffer 201, which are positioned furthest from the IN signal node, are coupled to remain on and thus do not have to be switched in response to IN. The "inner" P2 and N1 devices of the inverting buffer 201, which are positioned closest to the IN and OUT signal nodes, are both coupled to the IN signal node. In this manner, only the devices P2 and N1 need be switched in response to transitions of the IN signal. Since the inner P2 and N1 devices are closer to the input and output nodes, this results in the relatively fast signal transitions. In contrast, the situation is reversed for the inverting buffer 203 in which the outer devices P1 and N2 are coupled to IN whereas the inner devices P2 and N1 are always on. In this case, the outer devices P1 and N2 must be switched in response to the IN signal and thus the inverting buffer 203 is somewhat slower than the inverting buffer 401. In the case of the inverting buffer 205, all of the devices P1, P2, P3 and P4 must be switched in response to the IN signal, resulting in an even slower configuration as compared to either of the inverting buffers 201 and 203.

Figures 4, 5:
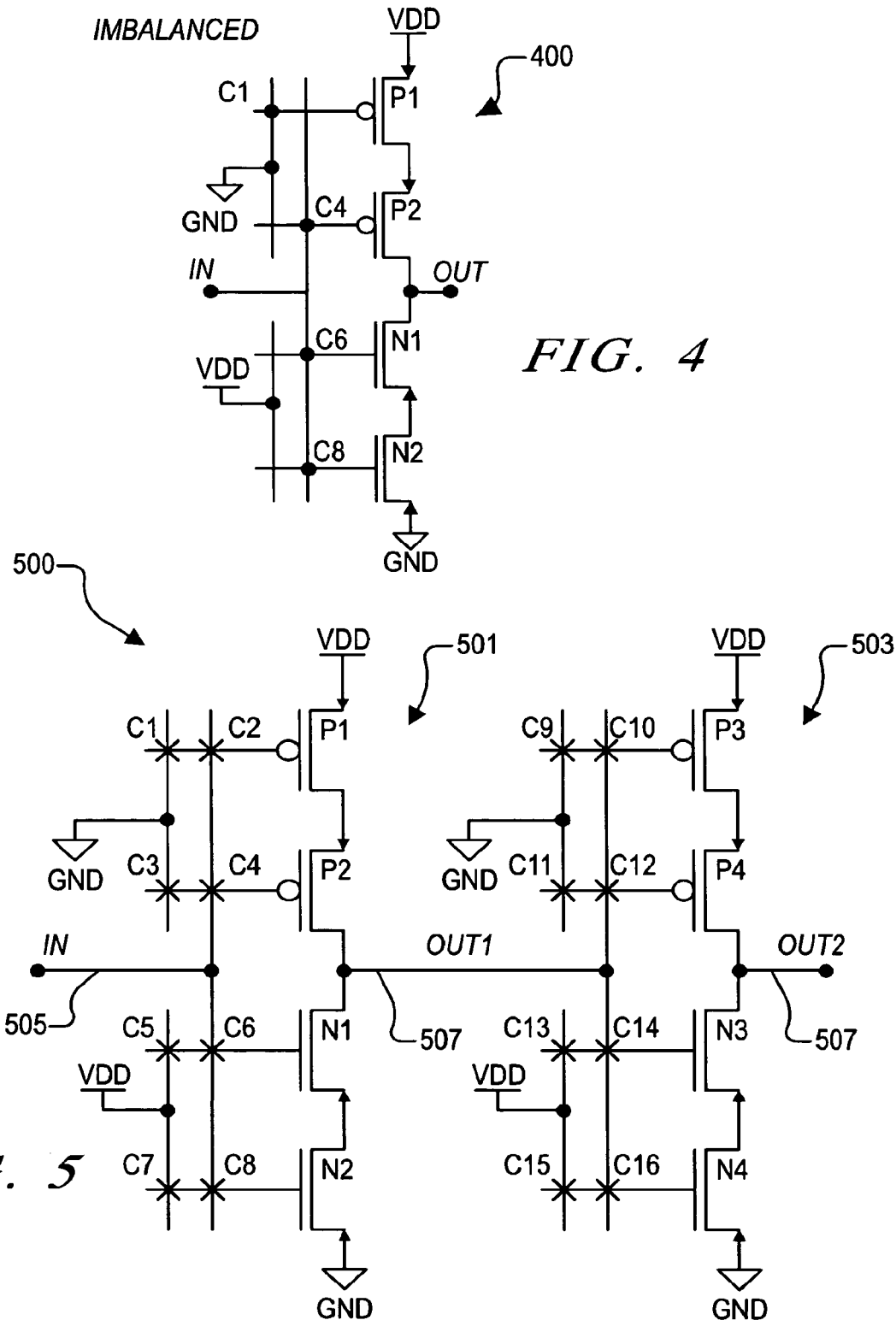
FIG. 4 is a schematic diagram of an inverting buffer, which is similar to the inverting buffer of FIG. 1 except that the connection points are programmed to achieve the fast/slow imbalanced configuration for the rising/falling edge transitions.
FIG. 5 is a schematic diagram of an adjustable non-inverting buffer implemented according to an exemplary embodiment of the present invention.

FIG. 4 is a schematic diagram of an inverting buffer 400, which is similar to the inverting buffer 100 except that the connection points C1, C4, C6 and C8 are programmed to achieve the fast/slow imbalanced configuration for the rising/falling edge transitions. If the P- and N-channel devices are otherwise equivalent, then the OUT signal rises relatively quickly in response to a falling edge of IN, whereas the OUT signal falls relatively slowly in response to a rising edge of IN.

There are several conditions or situations in which the imbalanced configuration may be used to compensate for differences in delays between the devices or caused by in-circuit conditions. The P- and N-channel devices may not, in fact, be equivalent such that a balanced connection selection otherwise results in a timing difference between the rising and falling edges. Assume, for example, that the N-channel devices N1 and N2 of the inverting buffer 300 operate significantly faster than the P-channel devices P1 and P2 such that in any of the "balanced" configurations, the falling edge occurs faster than the rising edge resulting in an undesired delay difference in signal transitions. The inverting buffer 400 is programmed with imbalance to at least partially compensate for the timing differences between signal transitions. In particular, both of the faster N-channel devices N1 and N2 must switch for falling edge transitions whereas only the P-channel device P2 switches for rising edge transitions (since P1 is always on). In this manner, the connection points of an adjustable inverting buffer implemented according to an embodiment of the present invention may be programmed to compensate for timing differences between the N- and P-channel devices. There are also various circuit conditions, such as loading factors and the like, in which the imbalanced configuration can be exploited to compensate for differences in timing, such as variations in duty cycle of the clock signal from the root node to the destination node(s). For example, a slight delay difference between the P- and N-channel devices causing a difference in rising and falling edge transitions is exacerbated with differences in loading from one inverting buffer to the next. A first inverting buffer with a small load generating a relatively small duty cycle distortion driving a second, similar inverting buffer with a larger load causes the second inverting buffer to further distort the duty cycle. The imbalanced configuration may be used in either or both inverting buffers to compensate for the timing differences and rebalance the duty cycle of the clock signal propagating through the clock tree.

FIG. 5 is a schematic diagram of an adjustable non-inverting buffer 500 implemented according to an exemplary embodiment of the present invention. The non-inverting buffer 500 includes back-to-back adjustable inverting buffers 501 and 503, each configured in substantially the same manner as the adjustable inverting buffer 100. In the combined configuration, the inverting buffer 501 includes P-channel devices P1 and P2 and N-channel devices N1 and N2, whereas the inverting buffer 503 includes P-channel devices P3 and P4 and N-channel devices N3 and N4, where the devices P3, P4, N3 and N4 are configured in a stacked configuration between VDD and GND in a similar manner as the devices P1, P2, N1 and N2, respectively. Also, the inverting buffer 501 includes the connection points C1-C8 and the inverting buffer 503 includes corresponding and analogous connection points C9-C16 as shown. The IN signal is provided on an input node 505 of the first inverting buffer 501 having its output coupled to a node 507 driving a first output signal OUT1. The first output node 507 also forms the input node of the second inverting buffer 503, having its output coupled to node 509 developing a second output signal OUT2.

Each of the inverting buffers 501 and 503 operate in substantially the same manner as the adjustable inverting buffer 100. The OUT1 signal is inverted relative to the IN signal and the OUT2 signal is inverted relative to the OUT1 signal, so that the OUT2 signal is a non-inverted and delayed version of the IN signal. The connection points C1-C8 of the inverting buffer 501 are programmed in a similar manner as previously described to adjust delay of the rising and falling edge transitions of OUT1 relative to IN and the connection points C9-C16 of the inverting buffer 503 are programmed in a similar manner to adjust delay of the rising and falling edge transitions of OUT2 relative to OUT1. Since each inverting buffer has nine valid programmable states, the adjustable non-inverting buffer 500 has 81 valid programmable states. This relatively large number of states provides significant flexibility for programming the amount of delay and for programming imbalance to compensate for device and/or circuit conditions as previously described. Note that if each inverting buffer 501 and 503 has a delay range of 100 to 140 ps with 20 ps increments, that the delay range of the non-inverting buffer 500 is 200 to 280 ps with 20 ps increments for each rising and falling edge transition (e.g., 5 programmable delay points for each rising and falling edge transition).

Figure 6:
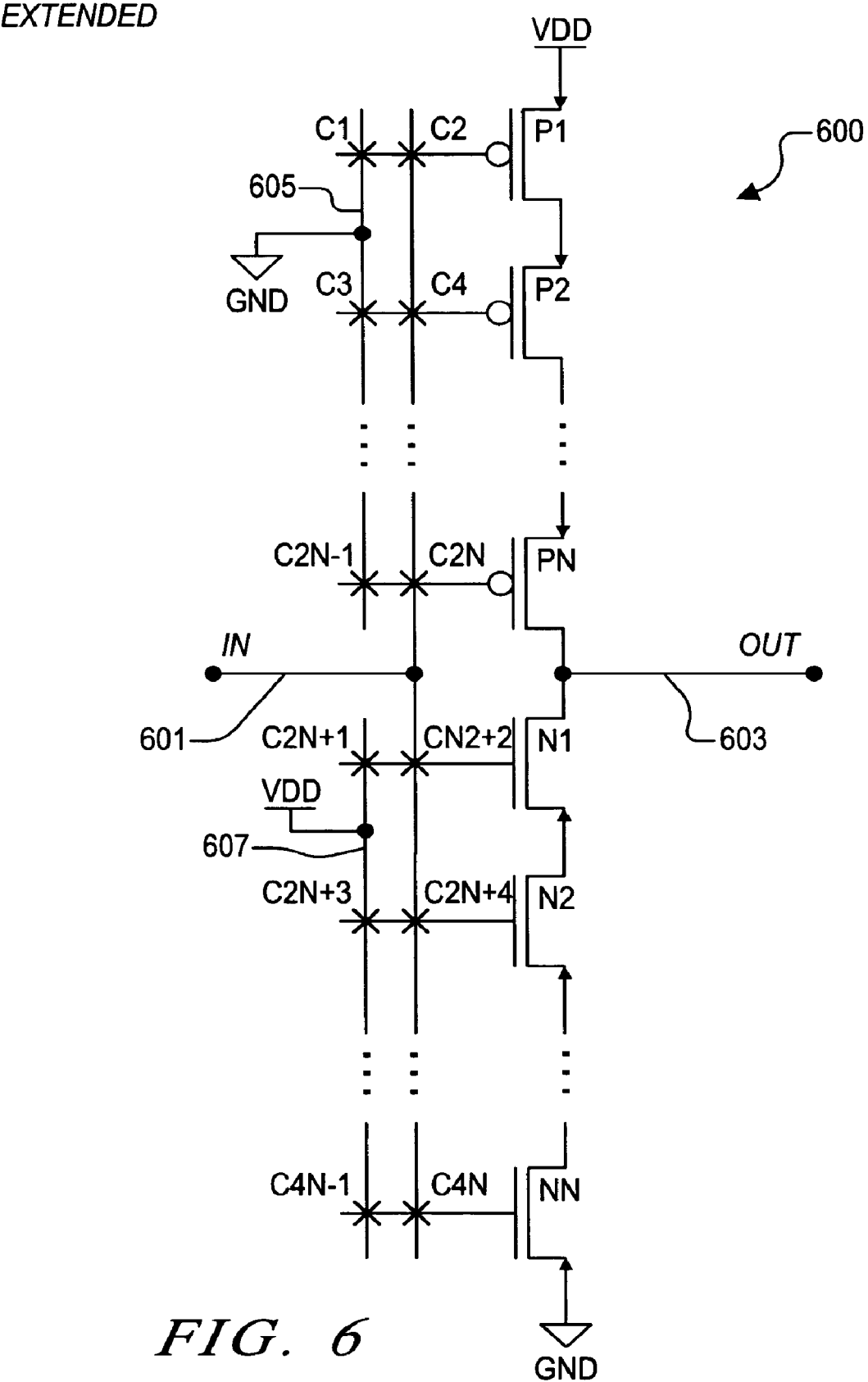
FIG. 6 is a schematic diagram of an extended adjustable inverting buffer implemented according to another embodiment of the present invention.

FIG. 6 is a schematic diagram of an extended adjustable inverting buffer 600 implemented according to another embodiment of the present invention. The inverting buffer 600 is substantially similar to the inverting buffer 100 except that additional devices are added to the stacked configuration to increase the number of programmable connection points. An input node 601 receives the input signal IN and an output node 603 develops the output signal OUT. A number N of P-channel pull-up devices P1, P2, ..., PN are stacked between VDD and output node 603 and the name number N of N-channel pull-down devices N1, N2, ..., NN are stacked between node 603 and GND. A node 605 is coupled to GND and routed near the gates of the P-channel devices and another node 607 is coupled to VDD and routed near the gates of the N-channel devices, which collectively forms 2N connection points C1, C2, ..., C2N−1, C2N for the P-channel devices and another 2N connection points C2N+1, ..., C4N for the N-channel devices. A benefit of the inverting buffer 600 as compared to the inverting buffer 100 is that the inverting buffer 600 provides increased programmability since providing additional discrete delay values for both rising and falling edge transitions. And the inverting buffer 600 may be cascaded or coupled in series with another similar inverting buffer 600 to achieve an extended non-inverting buffer (not shown) in a similar manner as the non-inverting buffer 500. The additional programmability comes at the cost of increased size for the inverting buffer. As described further below, it is desired to build a clock tree by distributing multiple adjustable buffers in the branches of the clock tree, so that additional size of the buffers consumes valuable space on the IC.

Figure 7:
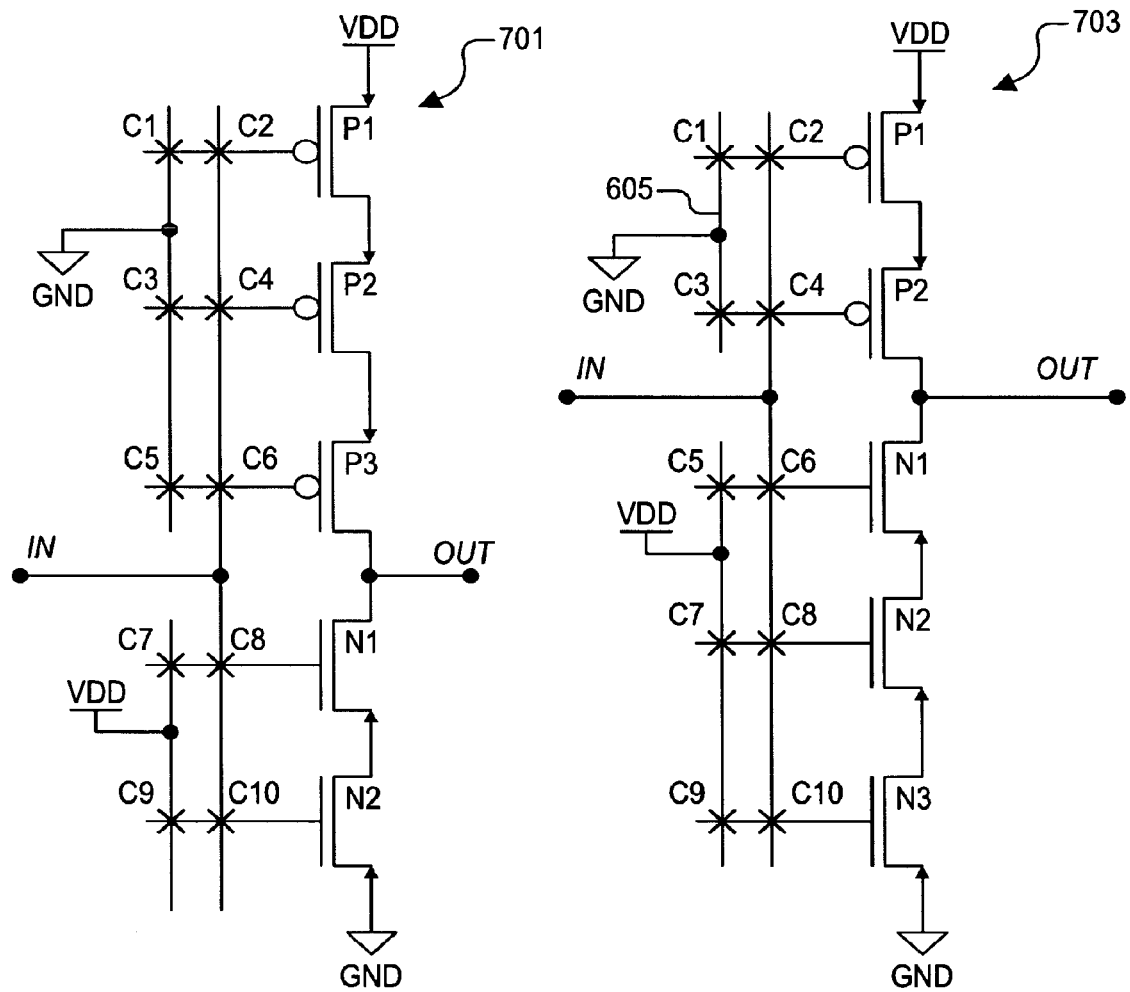
FIG. 7 is a schematic diagram of two adjustable inverting buffers each configured in an imbalanced configuration.

FIG. 7 is a schematic diagram of two adjustable inverting buffers 701 and 703 each configured in an imbalanced configuration. The inverting buffer 701 includes three P-channel devices P1, P2 and P3 rather than two and the inverting buffer 703 includes three N-channel devices N1, N2 and N3 rather than two, where each are otherwise configured in the same manner as the inverting buffer 100. The inverting buffers 701 and 703 each includes an additional device in the stack and thus includes ten connection points C1-C10. For the inverting buffer 701, the additional pair of connection points is for the P-channel device stack to provide additional programmability of the delay of the rising edge whereas for the inverting buffer 703, the additional pair of connection points is for the N-channel device stack to provide additional programmability of the delay of the falling edge. The inverting buffers 701 and 703 are also considered to be imbalanced configurations by design rather than by programmability. These imbalanced configurations of the inverting buffers 701 and 703 may also be used to compensate for differences between the P- and N-channel devices or even to replace balanced configuration buffers to adjust for circuit timing differences.

Figure 8:
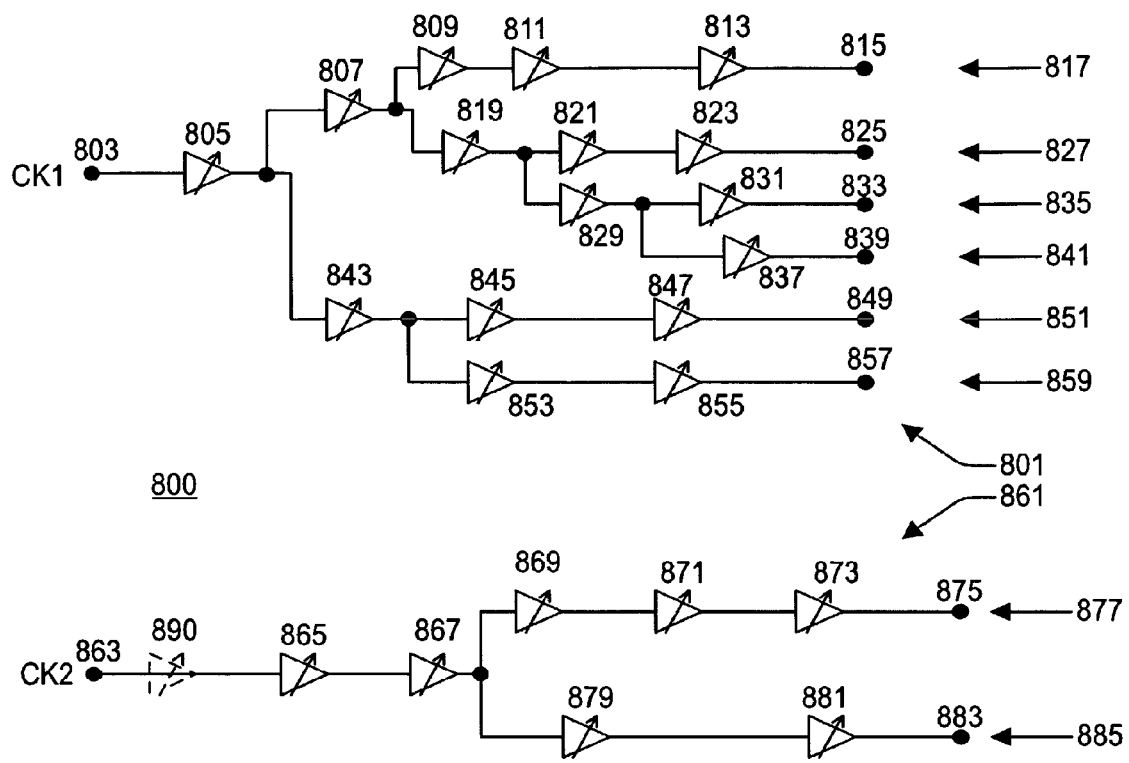
FIG. 8 is a schematic diagram of a circuit including two clock trees implemented according to an embodiment of the present invention.

FIG. 8 is a schematic diagram of a circuit 800 including clock trees 801 and 861 implemented according to an embodiment of the present invention. The circuit 800 is integrated on an IC or the like in which it is desired to distribute one or more clock signals from source or "root" nodes to one or more destination nodes for synchronizing operation of logic circuits (not shown) located at various positions on the chip. For each clock tree, conductive traces or the like are routed from a root node to corresponding destination nodes with uniform adjustable buffers inserted along each branch or path to drive the clock signal and maintain clock transition integrity. The term "uniform" means that the adjustable buffers are essentially identical with each other although each is separately programmable with a different delay for both rising and falling edge transitions. The first clock tree 801 distributes a first clock signal CK1 from a root node 803 to destination nodes 815, 825, 833, 839, 849 and 857 via corresponding clock tree branches 817, 827, 835, 841, 851 and 859, respectively. The second clock tree 861 distributes a second clock signal CK2 from another root node 863 to destination nodes 875 and 883 via corresponding clock tree branches 877 and 885, respectively. Although only two clock trees 801 and 861 are illustrated, it is understood that any number of clock trees may be used for any given system-on-chip (SOC) design. The clock signals CK1 and CK2 are related to each other and may have the same frequency or multiples thereof. For example, CK1 may operate at a relatively high frequency F whereas CK2 operates at a reduced frequency such as F/2, F/3, F/4, etc., or vice-versa. The root nodes 803 and 863 may be located relatively close together (such as co-located with clock generation circuitry) so that the clock signal CK1 and CK2 are already synchronized with each other. Alternatively, a timing differential may exist between the root nodes. In any event, it is desired to synchronize all of the destination nodes to ensure proper operation of the circuit 800.

The first branch 817 of the clock tree 801 includes non-inverting adjustable buffers 805, 807, 809, 811 and 813 coupled in series between the root node 803 and the destination node 815, where the output of the adjustable buffer 813 is coupled to the destination node 815. Each adjustable buffer is represented with a standard triangular buffer shape (driver, amplifier, etc.) with a diagonal arrow drawn through it to represent its adjustability. The next branch 827 of the clock tree 801 includes adjustable buffers 805, 807, 819, 821 and 823 coupled in series between the root node 803 and the destination node 815, where the output of the adjustable buffer 823 is coupled to the destination node 825. The adjustable buffer 807 drives the inputs of buffers 809 and 819, so that the branches 817 and 827 both include the adjustable buffers 805 and 807. The next branch 835 includes adjustable buffers 805, 807, 819, 829 and 831, where the buffers 829 and 831 are coupled in series between the output of buffer 819 and the destination node 833. The next branch 841 includes buffers 805, 807, 819 and 829 and includes adjustable buffer 837 having an input coupled to the output of buffer 829 and an output driving the destination node 839. The next branch 851 begins at buffer 805 in similar manner and includes adjustable buffers 843, 845 and 847 coupled in series between the output of buffer 805 and the destination node 849. The final branch 859 includes adjustable buffers 805, 843, 853 and 855 coupled in series between the root node 803 and the destination node 857. The first branch 877 of the clock tree 861 includes adjustable buffers 865, 867, 869, 871 and 873 coupled in series between the root node 863 and the destination node 875, where the output of the adjustable buffer 873 drives the destination node 875. The last branch 885 of the clock tree 861 includes adjustable buffers 879 and 881 coupled in series between the output of buffer 867 and the destination node 883.

The particular configurations of the clock trees 801 and 861 illustrated are specific to a given chip and circuit configuration in which it is understood that many variations are possible. For example, although the root node 803 is coupled to the input of only one buffer 805, additional buffers may be coupled to the root node 803 for other branches. Also, each buffer is shown as driving one or two other buffers, it is understood that any given buffer may drive any suitable number (e.g., three or more) of buffers depending upon the relative drive capabilities and loading of the individual buffers. And each tree may include any number of branches and any number of buffers per branch. Yet, as further described below, it is desired to achieve a certain amount of symmetry between the branches to minimize PVT variations, such as by keeping the number of buffers per branch relatively constant, and/or by keeping the relative fan-out of each buffer as consistent as possible.

In one embodiment, each of the non-inverting adjustable buffers in the clock trees 801 and 861 of the circuit 800 are configured in a similar manner as the adjustable non-inverting buffer 500. As further described below, the clock trees 801 and 861 are routed using the adjustable non-inverting buffer 500 along each branch of each tree and the minimum delay is "assumed" for each buffer at the time that the tree is first constructed. For the buffer 500, the minimum delay is the delay from the input IN to the output OUT2 for the fast configuration for both of the back-to-back inverting buffers 701 and 703. The fastest configuration is achieved by selecting connection points C1, C4, C6 and C7 for the inverting buffer 701 and further by selecting connection points C9, C12, C14 and C15 for the inverting buffer 703 (e.g., each similar to the fast inverting buffer 201). And then the delay of selected buffers are modified to adjust the timing for each branch of each tree that is faster than the slowest branch in the circuit 800.

A typical conventional clock tree synthesis (CTS) application uses multiple non-adjustable buffers with different delays and drive capabilities, varies the metal routing to vary loading, and varies the fan-out from one branch to another by a significant amount. The resulting compiled trees were reasonably accurate, such as resulting in timing variation between the branches on the order of 100 to 200 picoseconds (ps) for typical CMOS applications. And the CTS application was optimized for one PVT point but resulted in skew variations with PVT variations. Also, most CTS programs build one clock tree at a time potentially resulting in a relatively large variance in timing between multiple clock trees. The clock trees may be constructed manually resulting in more symmetrical and more accurate trees structures (such as within 10-20 ps for the same circuit). The manual process is very time consuming and thus relatively expensive. And in the event of any circuit changes, which are relatively common, the chip design may further be delayed by a significant amount of time (e.g., weeks or months). In contrast, the CTS system is fast, automatic and is easily re-executed in the event of circuit changes.

It is desired to maintain the benefits of CTS while also achieving the more accurate results that are typically only achieved using the manual method. In accordance with one embodiment of the present invention, an automatic CTS program is employed with some limitations and/or modifications, which is referred to as the "modified CTS". The clock trees 801 and 861, for example, are formed using the modified CTS using the minimum delay value for each adjustable buffer. In contrast to using multiple non-adjustable buffers, the modified CTS uses uniform adjustable buffers in which each adjustable buffer is substantially identical with each other. For example, the non-inverting adjustable buffer 500 may be used. Initially, the CTS operation does not attempt to take advantage of the adjustability of the adjustable buffer.

The delay of each branch of each clock tree is then determined assuming the minimum delay for each buffer. If there exists a significant timing differential between two or more clock trees, then additional adjustable buffers are added (set to their minimum) to the faster trees to achieve a rough timing equivalence between the trees. Such buffers may be added prior to the root nodes (e.g., 803 or 863) or possibly after the root node to add delay to all branches of that tree. As shown, for example, if it is determined that the clock tree 861 is significantly faster than the clock tree 801, then one or more additional buffers 890 (shown in dashed lines) is inserted at the root node 863 to slow down the clock tree 861 to have roughly the same delay as the clock tree 801. Note that the slowest tree is not modified with additional delay in accordance with the present invention, which avoids slowing down the entire circuit 800 as done in conventional clock tree configurations. Thus, if the optional adjustable buffer 890 is inserted into the clock tree 861, there is no need to add an adjustable buffer at the root node 803 of the clock tree 801 as was done in conventional CTS configurations. If buffers have been added to the faster trees, the delay of each branch of each modified clock tree is determined. Finally, each of the faster branches are adjusted to equal the delay of the slowest branch of all the clock trees. In particular, the delay of one or more of the adjustable buffers of each of the faster branches is increased until the overall delay of each and every branch of each and every clock tree is approximately the same as the slowest branch.

The modified CTS may further be constrained with optional parameters to improve initial results prior to further adjustment and to minimize PVT variations. First, the modified CTS is constrained to maintain approximately the same depth (number of buffers) per branch, such as within a delay percentage or within a predetermined number of buffers. This first constraint increases the probability that the timing between the clock trees of the initial configuration is roughly equivalent so that additional buffers need not be added to the faster trees. Second, the modified CTS is constrained to maintain approximately the same fan-out for each adjustable buffer so that each intermediate buffer drives approximately the same number of buffers (within a predetermined range). The conventional CTS program typically inserts large buffers to drive any number of downstream buffers at any given branch point. Instead, the modified CTS program is constrained so that each buffer drives up to a predetermined maximum (e.g., 2 or 3) so that the fan-out of the tree is relatively constant.

Figure 9:
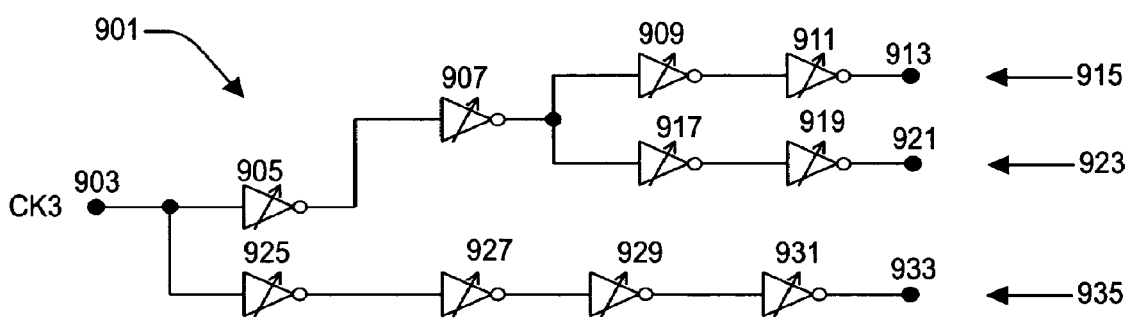
FIG. 9 is a schematic diagram of a clock tree implemented according to another embodiment of the present invention.

FIG. 9 is a schematic diagram of a clock tree 901 implemented according to another embodiment of the present invention. The clock tree 901 includes a root node 903 receiving a clock signal CK3, which is routed via 3 branches 915, 923 and 935 to respective destination nodes 913, 921 and 933. The tree branch 915 includes inverting buffers 905, 907, 909 and 911 coupled in series between the root node 903 and the destination node 913. The tree branch 923 includes the inverting buffers 905 and 907 and further includes inverting buffers 917 and 919 routed in series between the output of buffer 907 and the destination node 921. The tree branch 935 includes inverting buffers 925, 927, 929 and 931 coupled in series between the root node 903 and the destination node 933. Each inverting buffer is represented as an inverter with an arrow though it to symbolize its adjustability. The clock tree 901 is routed using the modified CTS program in a similar manner as the clock trees 801 and 863, except that the program uses an adjustable inverting buffer rather than a non-inverting buffer. In one embodiment, each adjustable inverting buffer is implemented in similar manner as the adjustable inverting buffer 100. The same additional constraints may be employed, such as maintaining approximately the same depth (number of buffers) per branch and/or maintaining approximately the same fan-out for each inverting buffer. An additional constraint when using inverting buffers is that each branch includes an even number of buffers to avoid inverting the clock signal at any of the destination nodes 913, 921 and 933. As shown, each of the tree branches 915, 923 and 935 of the clock tree 901 includes four inverting buffers.

The inverting buffer 100 provides the advantage over the non-inverting buffer 500 for routing the clock trees by potentially increasing the speed of the circuit. Each non-inverting buffer effectively includes back-to-back inverting buffers and thus represents approximately twice the delay from root node to destination node. The non-inverting buffer 500 provides one benefit of increased programmability at each buffer, which may be advantageous for inserting imbalance to compensate for timing differences between the rising and falling edge transitions. Another potential benefit of non-inverting buffers is that an odd number of non-inverting buffers are allowed for any given branch, whereas the use of inverting buffers may prevent an odd number of buffers for any branch. Yet in many configurations, the speed advantage using inverting buffers is significant over that of non-inverting buffers and the number of buffers per branch allows sufficient imbalance programmability if necessary.

Figure 10:
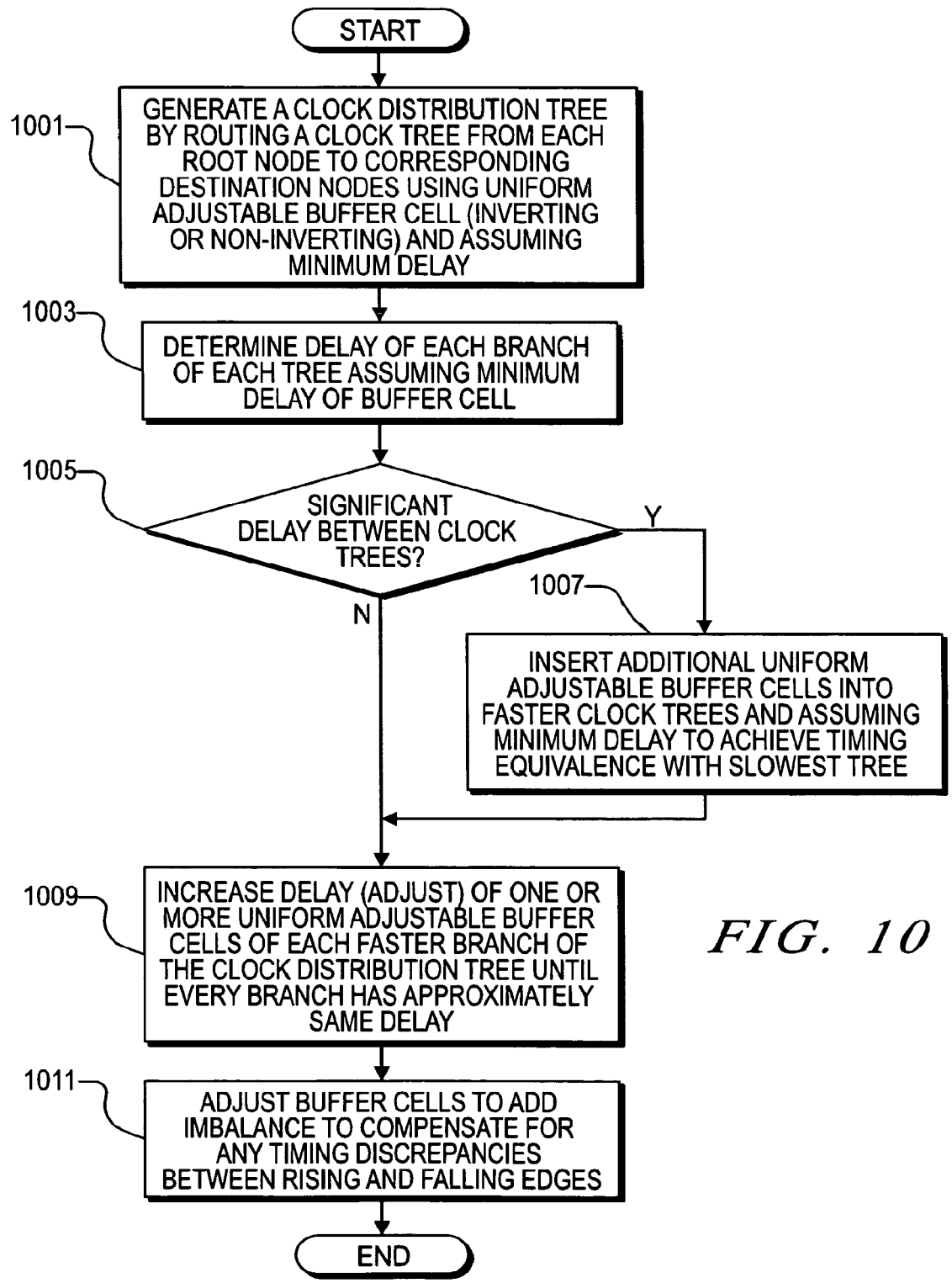
FIG. 10 is a flowchart diagram illustrating a method of routing a clock distribution tree according to an exemplary embodiment of the present invention.

FIG. 10 is a flowchart diagram illustrating a method of routing a clock distribution tree according to an exemplary embodiment of the present invention. At a first block 1001, a clock distribution tree is generated in which a clock tree is routed from each of one or more root nodes to corresponding destination nodes. The resulting clock distribution circuit includes one or more clock trees, each clock tree routing one clock signal to one or more destination nodes via corresponding branches of the tree. For multiple clock trees, the clock signals are related so that it is desired to synchronize each destination node in the clock distribution tree. Each clock tree of the clock distribution circuit is generating by routing conductive traces from its root tree to its destination nodes and inserting buffers where necessary to maintain the integrity of the clock signal. The buffers are uniform in that only one type of adjustable buffer is used for the entire clock distribution circuit. The buffer used is adjustable from a minimum delay to a maximum delay and is either inverting or non-inverting. At block 1001, the minimum delay is assumed for each buffer which tends to minimize the delay of the entire circuit (and thus maximize speed). Additional constraints may be employed at block 1001, including maintaining approximately the same depth (number of buffers) per branch and/or maintaining approximately the same fan-out for each buffer to minimize PVT variations.

The initial clock distribution tree may be routed by any method available. For example, a manual method is contemplated, which tends to improve symmetry and balance between the branches of the trees, and thus improves performance. The manual method, however, is time consuming and potentially expensive. An automated method, such as using a modified CTS program or the like, is also contemplated. The automated method is relatively fast although generally not as accurate as the manual method. The modified CTS uses the uniform adjustable buffer assuming the minimum delay. If the uniform buffer is an inverting buffer, then the CTS program ensures that each branch of each tree includes an even number of inverting buffers.

At next block 1003, the delay of each branch of each tree is determined assuming the minimum delay for each buffer. At next decision block 1005, it is determined whether there is a significant delay between clock trees if there are multiple clock trees. A significant delay exists if the delay between any two trees is equal to or greater than the minimum delay of a single uniform buffer. If there exists a significant timing differential between the clock trees as determined at block 1005, then operation proceeds to block 1007 in which additional adjustable buffers are added (set to their minimum) to the faster trees to achieve a rough timing equivalence with the slowest tree. Such additional buffers may be added prior to the root nodes (e.g., 803 or 863) or possibly after the root node to add timing to all branches of that tree. It is noted at this point that the slowest tree is not modified at this point with additional delay, which avoids slowing down the entire circuit as done in conventional clock tree configurations.

If there is only one tree or if there is not a significant delay between multiple trees as determined at block 1005, or after the additional buffers have been added at block 1007, operation proceeds to block 1009 in which the delay of one or more of the adjustable buffers of each of the faster branches is increased until the delay of each and every branch of each tree is approximately the same as the slowest branch, so that every branch of the clock distribution system has the same delay. This is achieved in any suitable manner, such as adjusting a minimum number of buffers (each up to maximum delay) or distributing the increase in delay along the branch. For example, assume each buffer is variable from 100 ps to 140 ps in 20 ps increments and there are five buffers in a given branch and a delay of 100 ps needs to be added. In a first solution, two buffers are increased from 100 ps (minimum delay) to 140 ps (maximum delay) to add 80 ps and one more buffer is increased from 100 ps to 120 ps to add the total of 100 ps along the branch. Alternatively, each of the five buffers are increased from 100 ps to 120 ps to add the total of 100 ps in a more distributed fashion. At final block 1011, any timing discrepancies between rising and falling edges are compensated, such as by programming imbalance into existing buffers or by replacing one or more buffers with imbalanced buffer configurations (e.g., buffer 400) and programming the imbalanced buffers.

The results achieved using a method according to the present invention are at least as good as the manual method, and can be achieved in about the same amount of time as the automated methods. For example, if the manual method provides timing differentials of about 20 ps and the adjustability of each buffer is about 20 ps, then each branch of each tree are within 20 ps of each other using the present invention rivaling the manual method. And the present invention lends itself to employing automated methods, such as CTS or the like. As previously described, a modified CTS is used to generate the initial tree to achieve branch timing differentials within 100-200 ps. Significantly faster trees are slowed with a sufficient number of buffers to be roughly equivalent to the slowest tree. Then, each faster branch is adjusted to equalize the delay of the slowest branch. The determination of the tree branch delays, the addition of buffers to the faster trees, and the tweaking of adjustable buffers may also be automated. For example, the modified CTS generates the initial tree, determines the relative timing between the trees, adds buffers to faster trees if necessary according to a predetermined algorithm, and then automatically tweaks each faster branch to match the delay of the slowest branch.

An adjustable buffer according to an embodiment of the present invention includes a first series of P-channel devices having current electrodes coupled in series between a first voltage supply and a first output node and a first series of N-channel devices having current paths coupled in series between the first output node and a second voltage supply. The P-channel devices include a first set of control electrodes, each coupled to a selected one of an input node and the second voltage supply collectively forming a first set of selectable connections. The N-channel devices include a second set of control electrodes, each coupled to a selected one of the input node and the first voltage supply collectively forming a second set of selectable connections. The first and second sets of selectable connections are selected to adjust delay from the input node to the first output node.

A device having its control electrode coupled to a voltage supply is not switched in response to the input signal thereby decreasing the delay of the corresponding transition. A device having its control electrode coupled to the input signal is switched in response to switching of the input signal thereby increasing switching delay from input to output. Since there are multiple selectable combinations for each of the first and second sets of selectable connections, the delay of each rising and falling edge transition for each buffer is programmable.

Any number of P- and N-channel devices may be used in which the number of P- and N-channel devices may be the same or different. A different number of devices forms an imbalanced configuration which may be advantageous to compensate for device differences or circuit timing discrepancies. The first and second sets of selectable connections may be "balanced" to achieve equivalent delay between the rising and falling edge transitions of the buffer. Alternatively, the first and second sets of selectable connections may be "imbalanced" to compensate for delay differences between rising and falling edge transitions, such as caused by device differences or circuit conditions.

A second series of both P- and N-channel devices may be included to form a second buffer, where the first and second buffers are coupled in series to form a larger buffer with increased programmability. If each buffer is inverting, then the combined configuration is a programmable non-inverting adjustable buffer.

A buffer with programmable delay according to one embodiment includes pull-up devices having current paths coupled between a first voltage supply and at least one output node and pull-down devices having current paths coupled between the at least one output node and a second voltage supply. Each of the pull-up devices has a gate coupled to a selected one of an input node and the second voltage supply collectively forming a first set of programmable connections. Each of the pull-down devices has a gate coupled to a selected one of the input node and the first voltage supply collectively forming a second set of programmable connections. The first and second sets of programmable connections are programmed to adjust delay from the input node to the at least one output node.

The programmable connections may be conductive connections defined in an integrated circuit mask or may be electronic switches. The devices may form a balanced configuration or an imbalanced configuration. The buffer may form an inverting or a non-inverting buffer. Multiple sets of pull-up and pull-down devices may be formed between multiple output nodes.

A buffer cell according to one embodiment includes PMOS devices having current electrodes coupled between a first voltage supply and at least one output node and NMOS devices having current electrodes coupled between the at least one output node and a second voltage supply. Each PMOS device has a gate coupled to a selected one of an input node and the second voltage supply and each NMOS device has a gate coupled to a selected one of the input node and the first voltage supply, collectively forming multiple programmable connections. The programmable connections are programmed to adjust delay from the input node to the at least one output node.

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

The invention claimed is:

1. A buffer with programmable delay, comprising:
    an input node;
    a first voltage supply node receiving a first supply voltage;
    a second voltage supply node receiving a second supply voltage;
    a plurality of pull-up devices having current paths coupled between said first voltage supply node and at least one output node and having a corresponding first plurality of gates, wherein each of said first plurality of gates is coupled to a selected one of said input node and said second voltage supply collectively forming a first plurality of programmable connections; and
    a plurality of pull-down devices having current paths coupled between said at least one output node and said second voltage supply node and having a corresponding second plurality of gates, wherein each of said second plurality of gates is coupled to a selected one of said input node and said first voltage supply node collectively forming a second plurality of programmable connections;
    wherein said first and second plurality of programmable connections are programmed to adjust delay from said input node to said at least one output node.

2. The buffer of claim 1, wherein said first and second plurality of programmable connections comprise conductive connections defined in an integrated circuit mask.

3. The buffer of claim 1, wherein said first and second plurality of programmable connections comprise electronic switches.

4. The buffer of claim 1, wherein said plurality of pull-up devices and said plurality of pull-down devices comprise a balanced configuration to enable symmetrical programming of rising edge transition delays and falling edge transition delays.

5. The buffer of claim 1, wherein said plurality of pull-up devices and said plurality of pull-down devices comprise an imbalanced configuration to enable asymmetrical programming of rising edge transition delays and falling edge transition delays.

6. The buffer of claim 1, wherein said plurality of pull-up devices and said plurality of pull-down devices comprise complementary metal-oxide semiconductor transistors.

7. The buffer of claim 1, wherein said plurality of pull-up devices and said plurality of pull-down devices comprise an inverting buffer.

8. The buffer of claim 1, wherein said plurality of pull-up devices and said plurality of pull-down devices comprise a non-inverting buffer.

9. The buffer of claim 1, wherein said plurality of pull-up devices comprises a first plurality of pull-up devices having current paths coupled between said first voltage supply node and a first output node and a second plurality of pull-up devices having current paths coupled between said first voltage supply node and a second output node, and wherein said plurality of pull-down devices comprises a first plurality of pull-down devices having current paths coupled between said first output node and said second voltage supply node and a second plurality of pull-down devices having current paths coupled between said second output node and said second voltage supply node.

10. The buffer of claim 1, wherein each of said plurality of pull-up devices comprises a P-channel device and wherein each of said plurality of pull-down devices comprise N-channel devices.

11. The buffer of claim 1, wherein said current paths of said plurality of pull-up devices are coupled in series between said first voltage supply node and said at least one output node, and wherein said current paths of said plurality of pull-down devices are coupled in series between said second voltage supply node and said at least one output node.

12. The buffer of claim 1, wherein said each of said first plurality of programmable connections comprises a selectable connection and wherein each of said second plurality of programmable connections comprises a selectable connection.

13. The buffer of claim 1, wherein said plurality of pull-up devices comprises a first number of pull-up devices and wherein said plurality of pull-down devices comprises a second number of pull-down devices wherein said first and second numbers are equal.

14. The buffer of claim 1, wherein said plurality of pull-up devices comprises a first number of pull-up devices and wherein said plurality of pull-down devices comprises a second number of pull-down devices wherein said first and second numbers are different.

15. The buffer of claim 1, wherein:
    said plurality of pull-up devices comprises first and second pull-up devices and wherein said plurality of pull-down devices comprises first and second pull-down devices;
    wherein said gate of said first pull-up device is coupled to said second voltage supply, wherein said control electrode of said second pull-down device is coupled to said first voltage supply, and wherein said gates of said second pull-up device and said first pull-down device are both coupled to said input node for a relatively small delay configuration;
    wherein said gate of said second pull-up device is coupled to said second voltage supply, wherein said gate of said first pull-down device is coupled to said first voltage supply, and wherein said gates of said first pull-up device and said second pull-down device are both coupled to said input node for a medium delay configuration; and
    wherein said gates of said first and second pull-up devices and said first and second pull-down devices are coupled together and to said input node for a relatively large delay configuration.

16. A method of providing a buffer and programming delay of the buffer, comprising:
    providing an input node and at least one output node;
    providing a first voltage supply node for receiving a first supply voltage and providing a second voltage supply node for receiving a second supply voltage;
    providing a plurality of pull-up devices each having a current path and a gate;
    providing a plurality of pull-down devices each having a current path and a gate; and
    electrically coupling each gate of each of the plurality of pull-up devices to either one of the input node and the second voltage supply node and electrically coupling each gate of each of the plurality of pull-down devices to either one of the input node and the first voltage supply node to adjust delay from the input node to the at least one output node.

17. The method of claim 16, wherein said coupling each gate of each of the plurality of pull-up devices and coupling each gate of each of the plurality of pull-down devices comprises defining conductive connections in an integrated circuit mask.

18. The method of claim 16, wherein said coupling each gate of each of the plurality of pull-up devices and coupling each gate of each of the plurality of pull-down devices comprises providing electronic switches.

19. The method of claim 16, wherein said coupling each gate of each of the plurality of pull-up devices and coupling each gate of each of the plurality of pull-down devices comprises coupling in a balanced configuration to provide symmetrical programming between rising and falling edge transition delays.

20. The method of claim 16, wherein said coupling each gate of each of the plurality of pull-up devices and coupling each gate of each of the plurality of pull-down devices comprises coupling in an imbalanced configuration to provide asymmetrical programming between rising and falling edge transition delays.

* * * * *